United States Patent
Palanivelu et al.

(10) Patent No.: US 9,686,800 B2
(45) Date of Patent: Jun. 20, 2017

(54) METHODS AND APPARATUS FOR REPORTING CHANNEL QUALITY INDICATOR (CQI)

(71) Applicant: QUALCOMM Incorporated, San Diego, CA (US)

(72) Inventors: Arul Durai Murugan Palanivelu, Bangalore (IN); Kapil Bhattad, Bangalore (IN); Dhananjay Ashok Gore, Bangalore (IN); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/829,600

(22) Filed: Mar. 14, 2013

(65) Prior Publication Data

US 2014/0036797 A1 Feb. 6, 2014

Related U.S. Application Data

(60) Provisional application No. 61/679,515, filed on Aug. 3, 2012.

(51) Int. Cl.
*H04W 72/08* (2009.01)
*H04L 1/00* (2006.01)

(52) U.S. Cl.
CPC ......... *H04W 72/085* (2013.01); *H04L 1/0026* (2013.01); *H04L 1/0027* (2013.01); *H04L 1/0028* (2013.01)

(58) Field of Classification Search
USPC ....................................................... 370/329
See application file for complete search history.

(56) References Cited

U.S. PATENT DOCUMENTS

| | | |
|---|---|---|
| 2008/0051037 A1 | 2/2008 | Molnar et al. |
| 2008/0056414 A1* | 3/2008 | Kim et al. .................... 375/347 |
| 2009/0239525 A1* | 9/2009 | Cai et al. ........................ 455/424 |
| 2010/0093287 A1* | 4/2010 | Higuchi et al. ............. 455/67.13 |
| 2010/0135230 A1* | 6/2010 | Baker et al. ................... 370/329 |
| 2010/0222008 A1 | 9/2010 | Astely et al. |
| 2010/0223363 A1* | 9/2010 | Sarikaya et al. .............. 709/220 |
| 2011/0021154 A1* | 1/2011 | Marinier et al. .......... 455/67.11 |
| 2011/0032839 A1 | 2/2011 | Chen et al. |
| 2011/0243026 A1 | 10/2011 | Kim et al. |

(Continued)

FOREIGN PATENT DOCUMENTS

WO    WO-2009008787 A1    1/2009

OTHER PUBLICATIONS

International Search Report and Written Opinion—PCT/US2013/052742—ISA/EPO—Oct. 11, 2013.

*Primary Examiner* — Yaotang Wang
(74) *Attorney, Agent, or Firm* — Patterson + Sheridan LLP

(57) ABSTRACT

Certain aspects of the present disclosure relate to techniques for reporting Channel Quality Indicator (CQI). In certain aspects, a User Equipment (UE) may schedule switch from at least a first set of zero or more antennas used by the UE, to at least one second set of zero or more antennas, wherein the first and second sets differ by at least one antenna. The UE may determine a Channel Quality Indicator (CQI) to be reported from the UE for use at a base station in a subsequent CQI subframe set, based at least on the scheduled switch. The UE may thereafter transmit the CQI to the base station.

66 Claims, 9 Drawing Sheets

(56) References Cited

U.S. PATENT DOCUMENTS

| | | |
|---|---|---|
| 2012/0071103 A1* | 3/2012 | Kadous et al. .............. 455/63.1 |
| 2012/0087254 A1 | 4/2012 | Yin et al. |
| 2012/0163208 A1 | 6/2012 | Kamble et al. |
| 2013/0045700 A1* | 2/2013 | Stallman et al. ............. 455/129 |
| 2013/0148636 A1* | 6/2013 | Lum et al. .................... 370/336 |

* cited by examiner

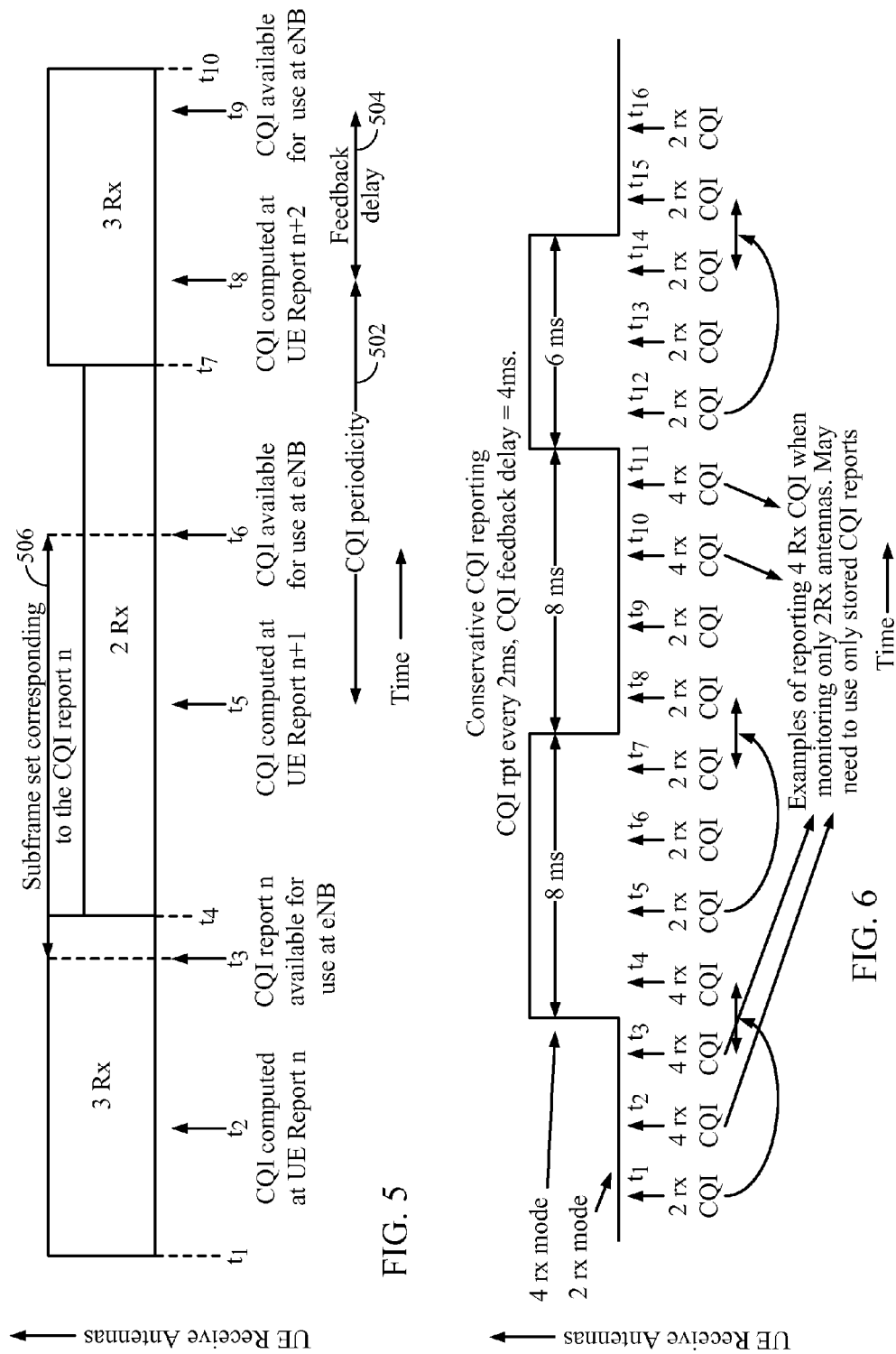

METHODS AND APPARATUS FOR REPORTING CHANNEL QUALITY INDICATOR (CQI)

CLAIM OF PRIORITY UNDER 35 U.S.C. §119

The present Application for Patent claims priority to U.S. Provisional Application No. 61/679,515, entitled "METHODS AND APPARATUS FOR REPORTING CHANNEL QUALITY INDICATOR (CQI)," filed Aug. 3, 2012, and assigned to the assignee hereof and hereby expressly incorporated by reference herein.

FIELD

Certain aspects of the present disclosure generally relate to wireless communications.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communications performed by a User Equipment (UE). The method generally includes scheduling a switch from at least a first set of zero or more antennas used by the UE, to at least one second set of zero or more antennas, wherein the first and second sets differ by at least one antenna, determining a Channel Quality Indicator (CQI) to be reported from the UE for use at a base station in a subsequent CQI subframe set, based on the scheduled switch, and transmitting the CQI to the base station.

Certain aspects of the present disclosure provide an apparatus for wireless communications by a User Equipment (UE). The apparatus generally includes means for scheduling a switch from at least a first set of zero or more antennas used by the UE, to at least one second set of zero or more antennas, wherein the first and second sets differ by at least one antenna, means for determining a Channel Quality Indicator (CQI) to be reported from the UE for use at a base station in a subsequent CQI subframe set, based on the scheduled switch, and means for transmitting the CQI to the base station.

Certain aspects of the present disclosure provide an apparatus for wireless communications by a User Equipment (UE). The apparatus generally includes at least one processor and a memory coupled to the at least one processor. The at least one processor is generally configured to schedule a switch from at least a first set of zero or more antennas used by the UE, to at least one second set of zero or more antennas, wherein the first and second sets differ by at least one antenna, determine a Channel Quality Indicator (CQI) to be reported from the UE for use at a base station in a subsequent CQI subframe set, based on the scheduled switch, and transmit the CQI to the base station.

Certain aspects of the present disclosure provide a computer program product for wireless communications. The computer program product generally includes a computer-readable medium including code for scheduling a switch from at least a first set of zero or more antennas used by the UE, to at least one second set of zero or more antennas, wherein the first and second sets differ by at least one antenna, determining a Channel Quality Indicator (CQI) to be reported from the UE for use at a base station in a subsequent CQI subframe set, based on the scheduled switch, and transmitting the CQI to the base station.

Various aspects and features of the disclosure are described in further detail below.

BRIEF DESCRIPTION OF THE DRAWINGS

FIG. 5 illustrates a typical antenna switching at a UE, in accordance with certain aspects of the present disclosure.

FIG. 6 illustrates an example of conservative CQI reporting, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
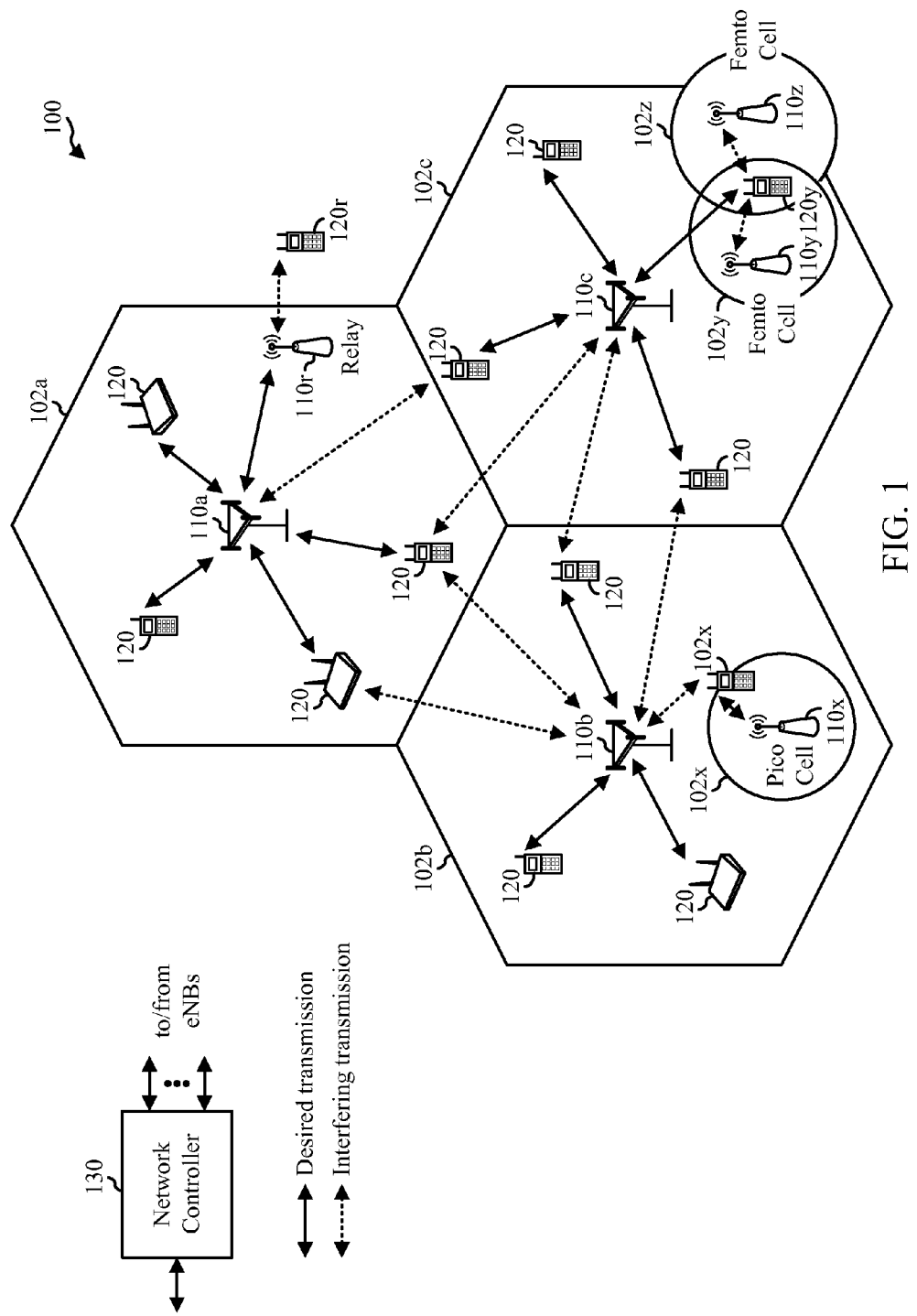
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.4, 3, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.4, 3, 5, 10, or 20 MHz, respectively.

Figure 2:
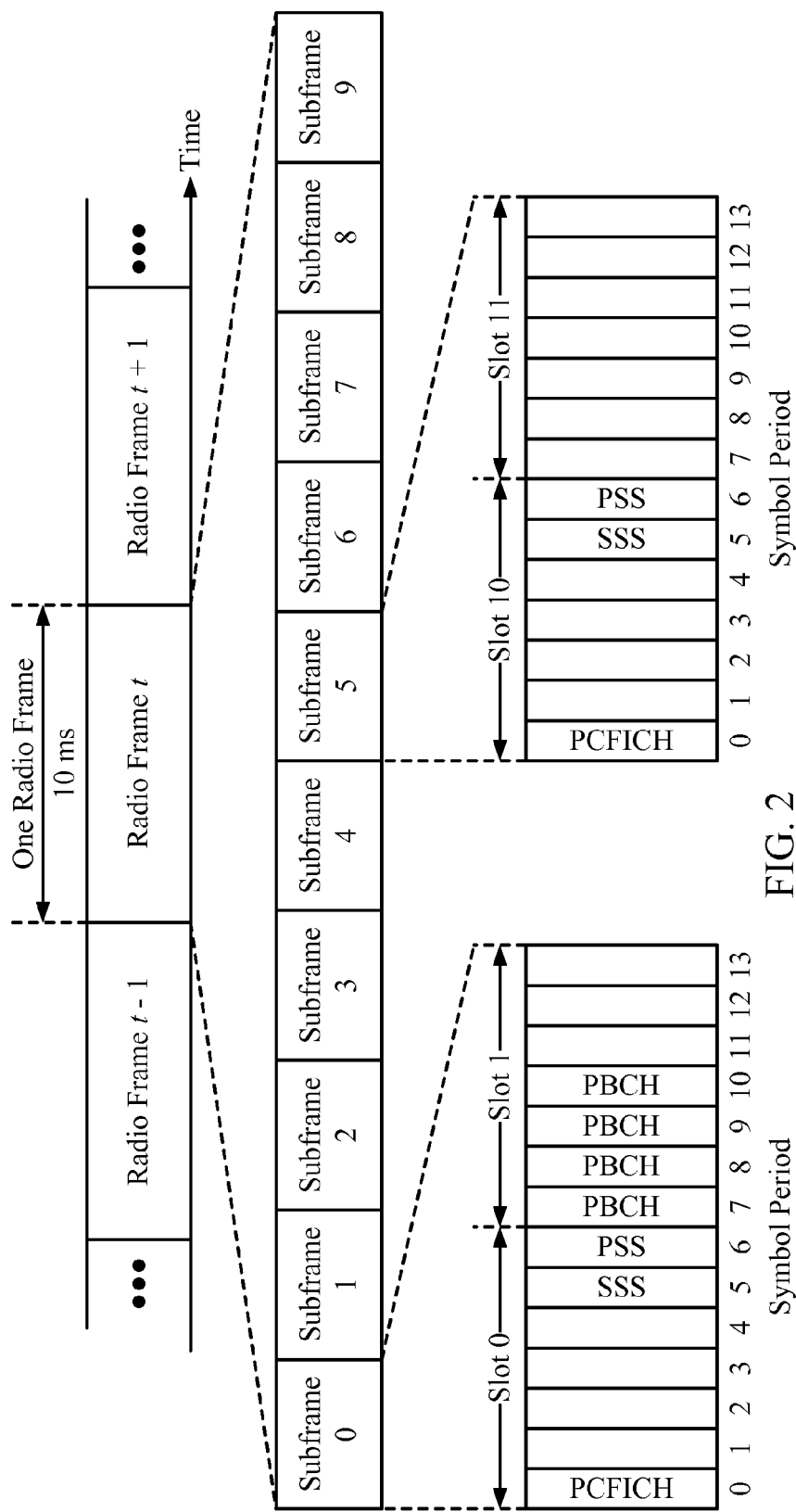
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
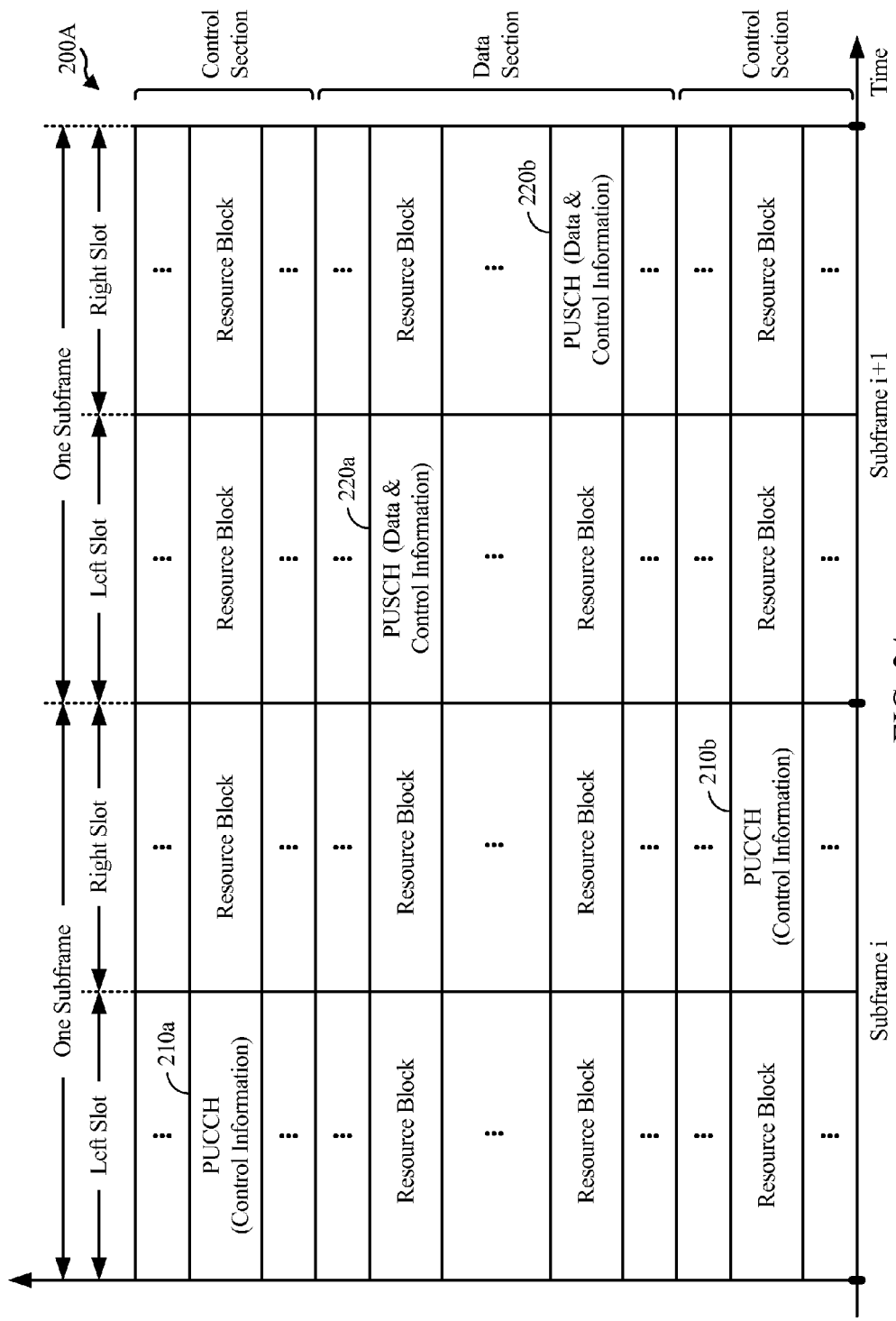
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
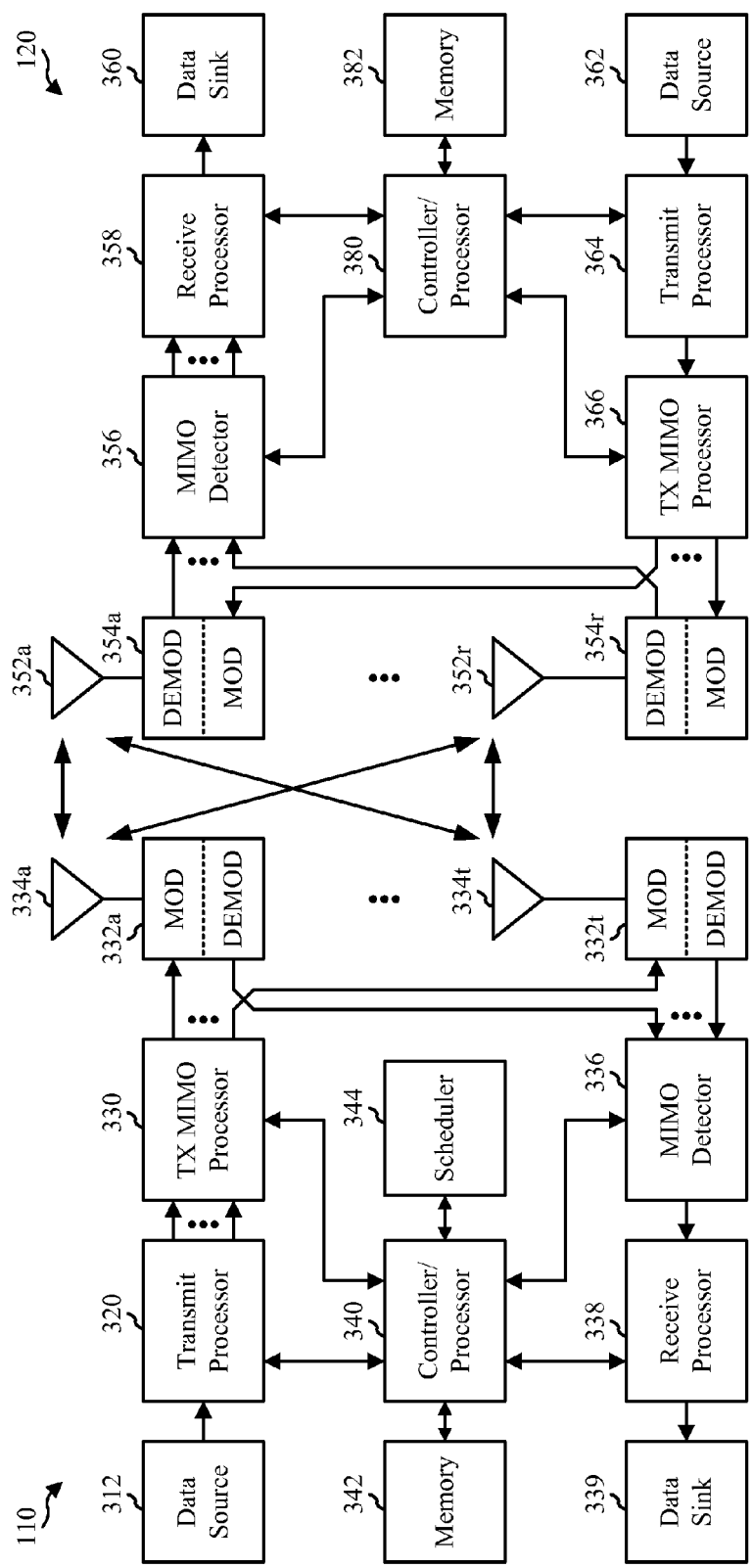
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations 900 in FIG. 9, and/or other processes for the techniques described herein. The memories 342 and 382 may store data and program codes for base station 110 and UE 120, respectively. A scheduler 344 may schedule UEs for data transmission on the downlink and/or uplink.

Example Methods and Apparatus for Reporting Channel Quality Indicator (CQI)

In devices that support both Wide Area Network (WAN) (e.g., LTE, High Speed Packet Access (HSPA), Evolution-Data Optimized (EVDO), etc.) and Wireless Local Area Network (WLAN)/Wi-Fi (e.g., 802.11 b/g/n) radio networks, antennas may be re-used by either radio network when the other is idle. The use case considered here is when both radio networks are active in the long term (i.e., both LTE and WLAN are associated with other devices/eNB etc.), but one of the radio networks is forced to idle mode for short intervals. For example, antennas of devices that support both LTE and WLAN networks may be shared between the radio networks. Each antenna of the device may potentially be used for LTE or WLAN. In certain aspects, the antennas of the device may be dynamically assigned to the two radio networks based, for example, on the throughputs of the networks. For example, in an area where WLAN coverage is stronger than LTE coverage, the WLAN throughputs may be higher than the LTE throughputs. In such a scenario, WLAN may be forced to the idle state (e.g., when no Wi-Fi activity is scheduled) for short intervals, and the WLAN antennas may be diverted for use with LTE for improving LTE transmission/reception. This may be done, for example, to substantially equalize LTE and WLAN throughputs or to satisfy certain criteria such as maximizing the minimum of the two throughputs. Such a criteria may be useful, for example, for a wireless relay that uses LTE for backhaul and WLAN for the access link. In an aspect, when the Wi-Fi link is better than the LTE link, a duty cycle may be imposed or adjusted to equalize Wi-Fi throughput and the backhaul LTE throughput. For example, a set of antennas may be used only for LTE, and another set of antennas may be shared between Wi-Fi and LTE (e.g. 50% duty cycle for Wi-Fi and the rest for LTE).

Figure 4:
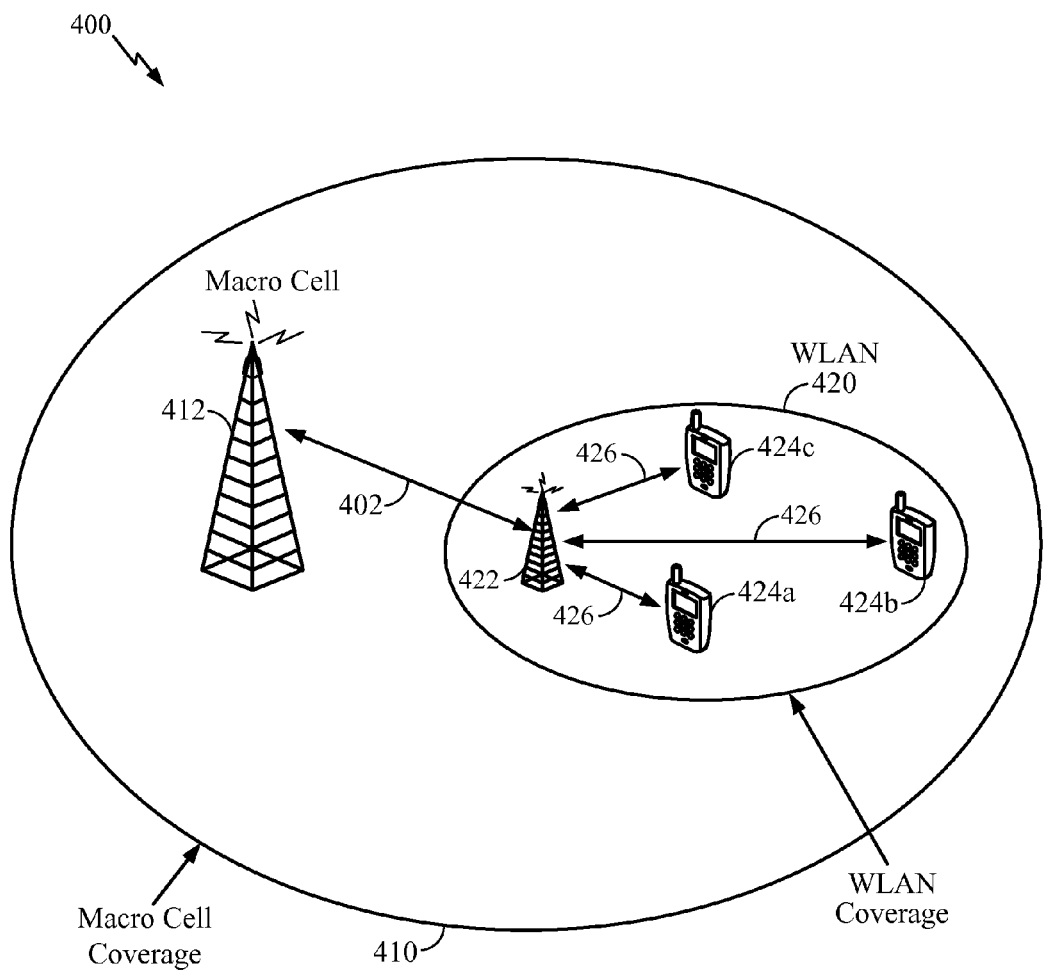
FIG. 4 illustrates an example wireless communication network including LTE and WLAN coverage in accordance with certain aspects of the present disclosure.

FIG. 4 illustrates an example wireless communication network 400 including LTE and WLAN coverage in accordance with certain aspects of the present disclosure. The wireless communication network 400 includes a macro cell eNB 412 providing WAN coverage 410 (e.g., LTE) to one or more devices. The network 400 may also include a WLAN access point (AP) 422 providing WLAN coverage 420 to devices 424 a, b and c. In an aspect, the devices 424 may include a mobile device such as a cell phone, smart phone, laptop, gaming device etc. In an aspect, the devices 424 may include an LTE UE capable of communicating with both the LTE eNB 412 and the WLAN AP 422. In an aspect, the WLAN AP 422 may provide devices 424 with access to one or more services provided by the eNB 412. For example, AP 422 may use LTE network 410 for backhaul and WLAN network 420 for access to devices 424. The AP 422 may communicate with the LTE eNB 412 via a communication link 402 (e.g., a backhaul link) and provide LTE services to devices 424 via WLAN links 426. For example, the AP 422 may be a MiFi wireless router (Wi-Fi hotspot) which may receive broadband internet service from eNB 412 and make internet connection available to up to five devices 424 connected to the MiFi device. In certain aspects, one or more of the devices 424 may act as a WLAN AP and provide one or more other devices with access to LTE services. In an aspect, the WLAN AP 422 may appear to the LTE eNB 412 as an LTE UE. Thus, the reference numeral 422 will be interchangeably used to refer to WLAN AP and UE (from the eNB 412 perspective).

In certain aspects, each antenna or a set of antennas at the AP 422 may be used for communication using LTE or WLAN. As noted above, the WLAN network 420 may be forced to idle state for certain intervals of time and one or more antennas or sets of antennas being used for WLAN communication may be diverted for use with LTE during these intervals. In an aspect, a first set of antennas at the AP 422 may only be used for LTE communication and a second set of antennas may be switched between WAN and WLAN. In certain aspects, if the WLAN is already in an idle mode or not needed, any set of antennas may be used for LTE.

In certain aspects, if the switching between antennas or sets of antennas between WLAN and WAN is frequent, the potential throughput gains due to the additional antennas(s) may not be realized if the eNB 412 does not have real-time knowledge of the number of receive antennas being employed currently by the UE's 422 to receive communications from the eNB 412. Generally, each UE periodically reports a Channel Quality Indicator (CQI) indicating a channel quality based on a current set of receive antennas used for LTE communication. The eNB schedules resources (e.g. Modulation and Coding Scheme (MCS)) based on the received CQI reports. However, there is typically a delay involved between the UE reporting the CQI and the reported CQI being available at the eNB for changing rates based on the reported CQI. This delay between the UE reporting CQI and the CQI being available for use at the eNB is typically referred to as the feedback delay. Thus, in certain aspects, the eNB 412 may not adapt its transmission rate in time to adapt to a changed antenna set at the UE 422. For example, the eNB 412 may transmit at rates corresponding to a lower number of receive antennas when additional antennas are available, resulting in poorer throughputs on subframes using these rates. Alternatively, the eNB 412 may transmit at rates corresponding to a larger number of receive antennas when fewer number of receive antennas are available, resulting in packet failures triggering re-transmissions.

FIG. 5 illustrates a typical antenna switching at a UE, in accordance with certain aspects of the present disclosure. The x-axis represents time and the y-axis represents the number of receive antennas (antenna configuration) used by a UE (e.g., UE 422) at a particular time instant. For example, the UE uses three receive antennas (3Rx) between time instants t1 and t4, uses two receive antennas (2Rx) between time instants t4 and t7, and again uses 3Rx between t7 and t10. The UE transmits CQI reports with a CQI periodicity 502. For example, the UE transmits CQI report n at t2, CQI report n+1 at t5, and CQI report n+2 at t8. Furthermore, in this example, the CQI report at time t may correspond to CQI report with the number of receive antennas being equal to the number of receive antennas being used at time t. As shown in FIG. 5, there is a feedback delay 504 between the UE reporting the CQI and the reported CQI being available for use at the eNB (e.g., eNB 422). The feedback delay may include a transmit time to the eNB, decoding time at the eNB and the time for mapping a transmit rate based on the CQI. As shown, CQI report n transmitted by the UE at t2 is available at the eNB at t3, CQI report n+1 transmitted at t5 is available at the eNB at t6, and CQI report n+2 transmitted at t8 is available at the eNB at t9. Thus, the eNB uses CQI report n between t3 and t6, uses CQI report n+1 between t6 and t9, and uses CQI report n+2 after t9. In an aspect, due to this feedback delay, the eNB may continue to transmit data at rates corresponding to the last received CQI until the next CQI report is available at the eNB, although the UE may have switched antennas during this interval. For example, the eNB may continue to transmit at 3Rx rates between t3 and t6 although the UE has switched to 2Rx antennas at t4. The eNB may start transmitting at 2Rx rates only after t6 when the CQI report n+1 based on 2Rx antennas is available for use.

In certain aspects, a CQI subframe set may be defined corresponding to each CQI report as including subframes for which the CQI report is being used. In an aspect the length of the subframe set may correspond to the length of time for which the CQI report shall be used by the eNB. For example, FIG. 5 shows subframe set 506 corresponding to CQI report n, the length of the subframe set 506 being equal to the length of time between time instants t3 and t6 when the CQI report n is available for use at the eNB. In an aspect, the UE configures the CQI subframe set based on the feedback delay between the UE reporting the CQI and the eNB using it. In an aspect, the UE may not know the amount of the feedback delay and may determine it by comparing the past CQI reports and the MCS scheduled by the eNB. For example, if the UE reports two very different CQIs, it may determine the feedback delay by monitoring when (e.g., at which subframes) the MCS for transmissions from the eNB changes substantially. Alternately, the UE may simply assume a fixed value for the feedback delay.

In certain aspects, the antennas or sets of antennas used for reception by the UE may change within the length of the CQI subframe set. For example, as shown in FIG. 5, the UE uses 3Rx antennas between t3 and t4, and uses 2Rx antennas between t4 and t6. In certain aspects, the CQI reported by the UE may be chosen as a function of the CQI's for each antenna set that will be used during the length of a CQI subframe set and the number of subframes within the subframe set for which the antenna set will be used. For example, if the UE will use 2Rx antennas for N1 subframes and will use 3Rx antennas for N2 subframes of a particular CQI subframe set, the UE may report 2Rx CQI if N1/N2 is greater than a (configurable) threshold, and the UE may report 3Rx CQI if N1/N2 less than or equals the threshold, for use during the interval of the CQI subframe set. In an aspect, the UE may determine the CQI being used for each subframe based on the feedback delay.

In certain aspects the UE may select the minimum CQI value among all the antenna set(s) to be used between the current and the next CQI report available at the eNB. For example, in the CQI report, the UE may report the minimum of the CQI expected to be seen in all the subframes in the corresponding CQI subframe set. In an aspect, selecting the minimum CQI avoids block errors due to rate mismatch between the eNB transmit rates and the UE receive capability.

FIG. 6 illustrates an example of conservative CQI reporting, in accordance with certain aspects of the present disclosure. The x-axis represents time and the y-axis represents the number of receive antennas used by a UE (e.g., UE 422) at a particular time instant. As shown, the UE may use 2Rx or 4Rx antennas. The example scenario shown in FIG. 6 assumes a CQI report periodicity of 2 ms and a CQI feedback delay of 4 ms. Thus, the UE transmits one CQI report every 2 ms and each CQI report is available at the eNB 4 ms after it is transmitted by the UE. For example, the 2Rx CQI transmitted by the UE at t1 will be available for use at the eNB after the 4 ms feedback delay at t3, which the eNB may use for transmission until t4 when the next 4Rx CQI report transmitted at t2 is available for use.

In certain aspects, the UE may select the CQI reports conservatively. For example, as noted above, the UE may select the minimum of CQI values among all antenna set(s) to be used between a current and next CQI report available for use at the eNB. For example, referring to FIG. 6, between time instants t3 and t4, the UE uses both 2Rx and 4Rx receive antennas. Following the conservative approach, the UE may select a CQI corresponding to the minimum number of antennas for use between t3 and t4, i.e. 2Rx CQI. As shown, at time t1, the UE reports 2Rx CQI for use between t3 and t4. Similarly, the UE is scheduled to use both 2Rx and 4Rx antennas between t7-t8, t11-t12, and t14-t15. As shown, the UE, following the conservative approach, reports 2Rx CQI at t5, t9 and t12 for use during these intervals respectively.

In certain aspects, the UE may select the maximum of the CQI values among all antenna set(s) to be used between a current and a next CQI report available for use at the eNB. This may provide a better throughput because the eNB may transmit at a higher rate on subframes scheduled to be transmitted when the UE receives using more number of antennas. However, in order to handle subframes transmitted when the UE is receiving with lesser number of antennas, re-transmissions/HARQ parameters must be optimized well at both the eNB and the UE ends.

In certain aspects, the CQI reported by the UE may be tuned to the Quality of Service (QOS) of the traffic. In an aspect, the UE may report a more conservative CQI if the traffic is intolerant to delays and/or errors. On the other hand, the UE may report a much more aggressive CQI if the delay and/or errors is not a factor. For example, if the traffic is video (low latency required), then CQI reporting may be more conservative since block errors and re-transmissions may incur a high cost.

In certain aspects, if the CQI of some antenna set(s) may not be computed by the UE using the current channel estimates, the UE may report a previously computed and stored CQI value corresponding to the antenna set. In an aspect, this may require that the UE store in a memory the last computed CQI values corresponding to each antenna set (for example, antenna sets {1}, {1,2}, {2,3}, etc). For example, referring back to FIG. 6, the UE reports 4Rx CQIs at time instants t2 and t3, as the UE is scheduled to use 4Rx antennas when these reports are available for use at the eNB during t4-t5 and t5-t6 respectively. However, the UE is using 2Rx antennas at t2 and t3. Thus, the UE may not be able to estimate the channel corresponding to 4Rx antennas at t2 and t3. Thus, the UE may use 4Rx CQIs previously computed and stored in a memory. It may be noted that the UE may store channel estimates of the antennas instead and use combination of stored and current channel estimates.

In certain aspects, a stored CQI may not be relevant if the channel has changed significantly since the CQI was computed and stored. The relevancy of a stored CQI may be determined based, for example, on the Doppler estimate for the UE. In an aspect, the stored CQI may be relevant only for a low Doppler use-case. A CQI storage block may additionally include a timer to infer whether the stored CQI may be used as a substitute for a current CQI. In alternative aspects, the UE may add an additional value to a CQI corresponding to a lower number of antennas (e.g., 2Rx antennas) to get it closer to a CQI corresponding to a higher number of antennas (e.g., 4Rx antennas). In another alternative aspect, the UE may compute CQI corresponding to both 4Rx and 2Rx when it is using 4Rx and add the difference between the two CQIs to the 2Rx CQI when only 2Rx are being used and 4Rx CQI is required.

In certain aspects, if the last CQI report available for use at the eNB is higher than the current UE receive capability, there may be block errors leading to the eNB outer loop applying a backoff to the eNB transmit rate due to NACKs from the UE. However, this backoff may hurt the eNB transmit rate after the new CQI report (corresponding to the current number of UE receive antennas) that indicates the UEs true receive capability is available for use at the eNB.

Figure 7:
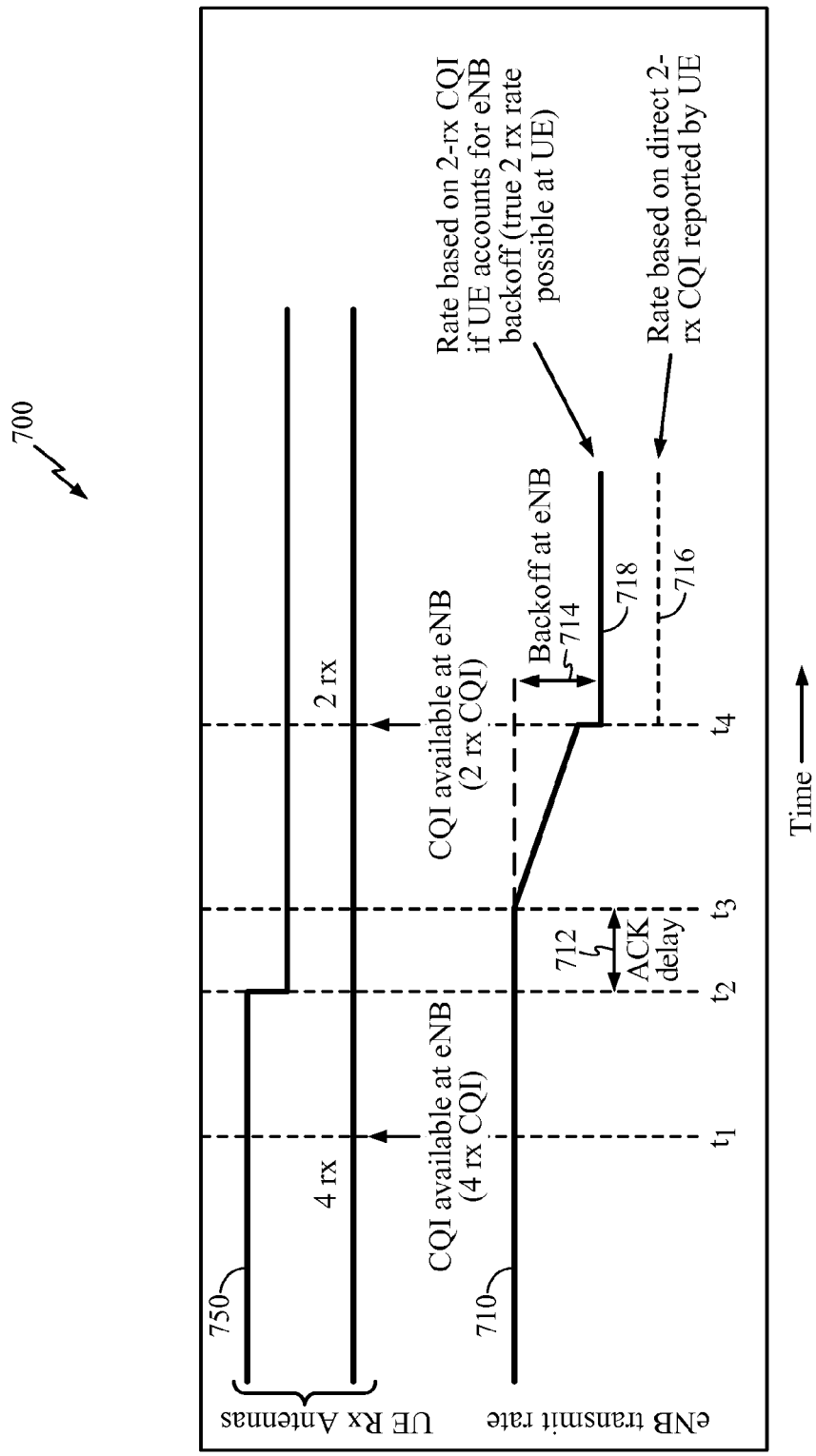
FIG. 7 shows a plot illustrating CQI reporting to compensate eNB backoff, in accordance with certain aspects of the present disclosure.

FIG. 7 shows a plot 700 illustrating CQI reporting to compensate eNB backoff, in accordance with certain aspects of the present disclosure. The x-axis represents time, and plots 710 and 750 represent eNB transmit rates and number of antennas used at the UE respectively corresponding to the time. As shown in FIG. 7, the UE uses 4Rx antennas before time instant t2 and switches to 2Rx antennas at t2. The 4Rx CQI report is available for use at the eNB at t1 and the 2Rx report is not available for use at the eNB before t4. Thus, the eNB may continue to transmit at 4Rx rates between t2 and t4, although the UE has switched to 2Rx antennas during this interval. As discussed above this may lead to block errors at the UE. For example, for eNB transmissions starting at t2, the eNB may start receiving NACKs from the UE after an ACK delay 712 at t3. In response to receiving the NACKs from the UE, the eNB may start applying backoff 714 at t3 (a certain backoff for each received NACK). However, once the 2Rx CQI is available for use at the eNB at t4, the eNB may start transmitting at 2Rx rates, but continue to apply the backoff 714. Thus, the eNB may end up transmitting at a rate 716 that is much lower than 2Rx rates affecting throughput.

In certain aspects, in order to offset (or compensate for) the backoff the eNB continues to apply, the UE may report a higher CQI than computed, when switching from a better to worse antenna configuration. Referring to FIG. 7, the UE may report a CQI higher than the 2Rx CQI for use after t4. This may cause the eNB to transmit at a rate 718 that is much closer to the 2Rx rate. In an aspect, the value of the backoff may be allowed to decay with time (starting from the first CQI report after switching). The applied backoff may also take into account differences in average backoff at the eNB for different receive antenna modes at the UE.

Similarly, the UE may report a lower CQI than computed when switching from a worse to a better antenna configuration.

In certain aspects, even with smarter CQI reporting as discussed above, there may still be ambiguity in reporting CQI if the reported CQI is used to set eNB transmit rate for widely different UE receive configurations. For example, if the UE will be in 2Rx and 4Rx modes equally for ten subframes each between a current and next CQI available for use at the eNB, then no single value of the CQI report may be optimal for the whole interval. In an aspect, in order to avoid such ambiguity, antenna switching between WAN and WLAN may be aligned such that within each CQI report period at the eNB, UE uses only one antenna configuration. Over a longer time-scale, antenna switch pattern may also be designed to satisfy duty cycle requirements (e.g., duty cycle of Wi-Fi and/or LTE) in addition to the aligning constraint mentioned above. For example, if the CQI reporting interval is 20 ms and the required duty cycle is 80%, then switch periods of 80 ms/20 ms that align with CQI reporting instances may be chosen.

Antenna/Duty Cycle Selection with Antenna Adaptation

In certain aspects, antenna set(s) and duty cycle among the optimal antenna sets may be selected in order to optimize some suitable criterion(a). An example for antenna set selection, for example if we have 3Rx systems where 2 antennas have to be allocated for LTE and one for WLAN, the antennas may be partitioned in the following three ways –(1) {1,2} for LTE {3} for WLAN, (2) {1,3} for LTE and {2} for WLAN, and (3) {2,3} for LTE and {1} for WLAN. In an aspect, performance may be different in these three cases and the UE may pick the one with the best performance criteria. In an aspect, a suitable criterion may include maximizing the sum of LTE and WLAN throughputs, or maximizing the minimum of the two throughputs (relevant to MiFi use-case).

Figure 8:
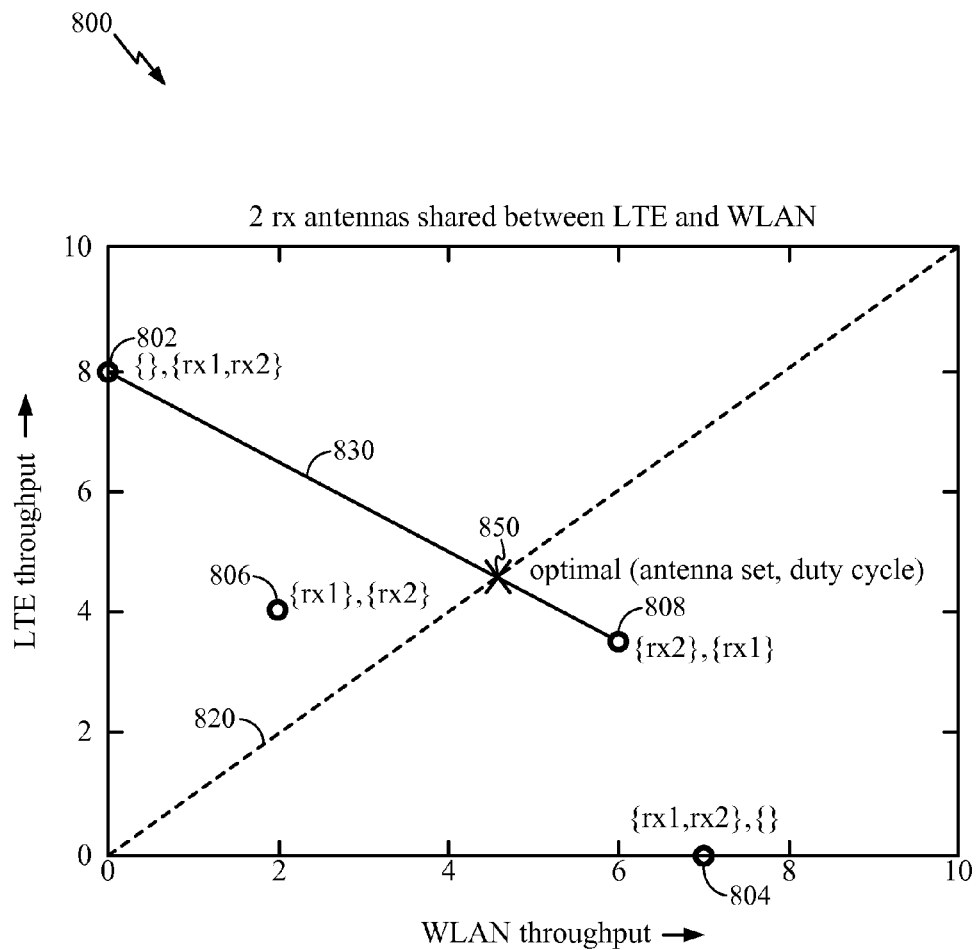
FIG. 8 shows a plot illustrating maximizing the minimum of LTE and WLAN throughputs, in accordance with certain aspects of the present disclosure.

FIG. 8 shows a plot 800 illustrating maximizing the minimum of LTE and WLAN throughputs, in accordance with certain aspects of the present disclosure. The x-axis of the plot 800 denotes WLAN throughputs and the y-axis of the plot denotes LTE throughputs. The example scenario of FIG. 8 assumes 2Rx antennas (rx1 and rx2) that need to be shared between LTE and WLAN such that the minimum of the two throughputs is maximized. Point 802 on the y-axis represents both antennas used for LTE and point 804 denotes both antennas used for WLAN. Points 806 and 808 represent using one antenna each for LTE and WLAN. Line 820 represents a 45 degree line, such that any point on the line 820 yields equal throughputs for LTE and WLAN. Line 830 represents time sharing between different antenna configurations, i.e. duty cycle, with point 802 (both antennas for LTE) at one end of the line and point 808 (one antenna each for LTE and WLAN) at the other end of the line. Point 850 represents an optimal selection of antenna set(s) and duty cycle for maximizing the minimum of LTE and WLAN throughputs.

In certain aspects, antenna and duty cycle selection may also take into account the nature of transmitted/received packets. For example, WLAN may allocate only one antenna when either transmitting or when expecting only beacon and management packets, but may allocate two or more antennas when receiving/expecting data traffic.

In certain aspects, in order to perform antenna and duty cycle selection, both LTE and WLAN need to know the full channel estimate, i.e, with all antennas. In an aspect, to avoid LTE throughput degradation, WLAN channel measurement may be done when LTE downlink subframes are scheduled where no DL grant is detected. For example, the UE may decode the PDCCH which is typically transmitted in the first few OFDM symbols, and determine if there is a DL grant scheduled during a particular LTE downlink subframe(s). If the UE does not detect a DL grant, it may divert the LTE antenna(s) for performing WLAN channel measurement during the interval of the LTE downlink subframe(s), and return the antennas back to LTE before the next LTE subframe starts.

Figure 9:
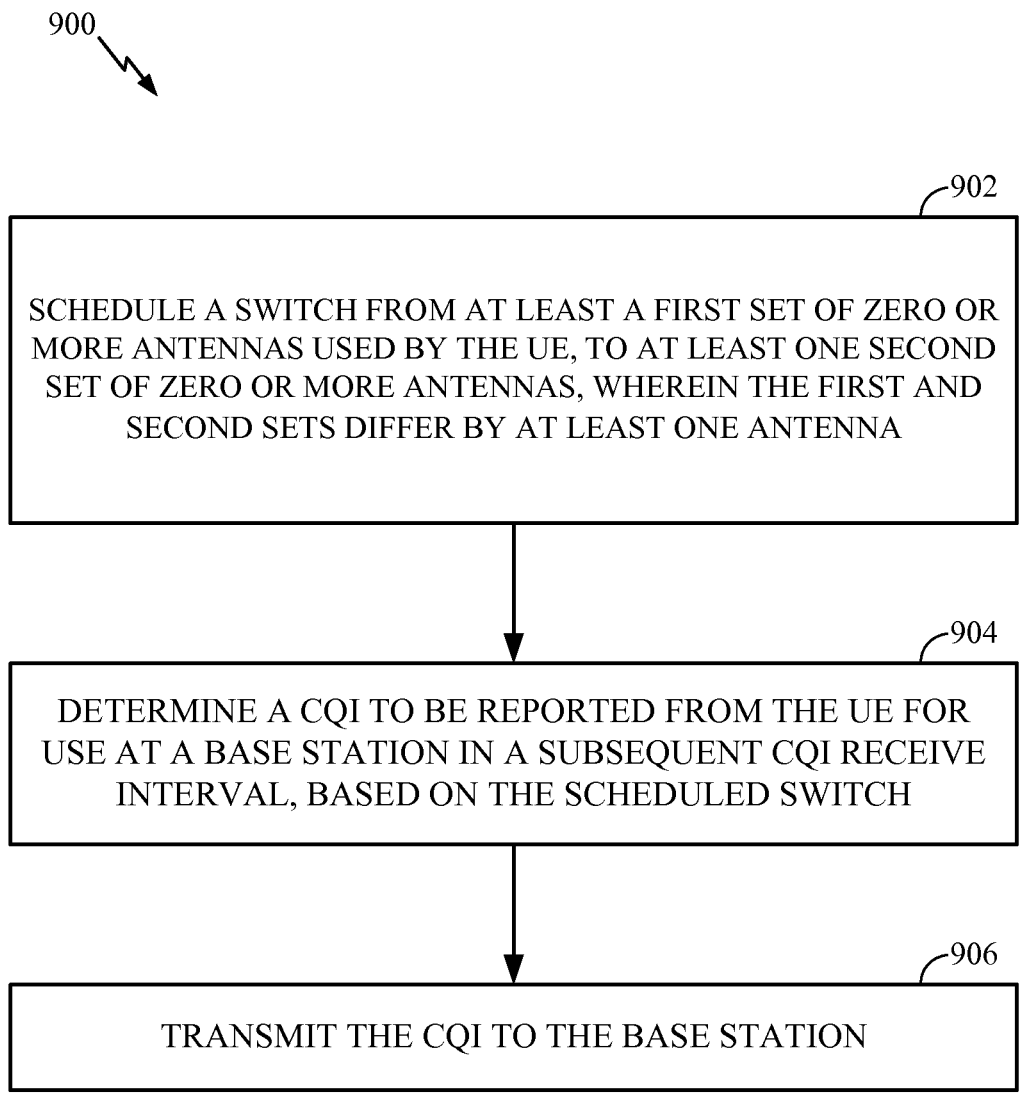
FIG. 9 is a low diagram illustrating operations by a User Equipment (UE) for reporting CQI, in accordance with certain aspects of the present disclosure.

FIG. 9 is a flow diagram illustrating operations 900 by a User Equipment (UE) for reporting CQI, in accordance with certain aspects of the present disclosure. Operations 900 begin, at 902, by scheduling a switch from at least a first set of zero or more antennas used by the UE, to at least one second set of zero or more antennas, wherein the first and second sets differ by at least one antenna. At 904, a CQI to be reported from the UE may be determined for use at a base station in a subsequent CQI subframe set, based on the scheduled switch. At 906, the CQI may be transmitted to the base station.

In certain aspects, the first set of zero or more antennas are used by the UE for communication in a first Radio Access Technology (RAT), and wherein the second set comprises at least one additional antenna for the first RAT originally configured for communication in a second RAT. In alternative aspects, the second set of antennas may include one or more fewer antennas than the first set of antennas.

In certain aspects, the UE may define the CQI subframe set corresponding to the reported CQI, with a length of the CQI subframe set corresponding to a CQI receive interval at the base station. In an aspect the CQI receive interval at the base station may be a time period between receiving two consecutive CQI reports from the UE.

In certain aspects, the CQI subframe set may be defined based on a feedback time delay between the transmission of the CQI from the UE and the base station adjusting a transmission rate based on the CQI. In an aspect, the feedback time delay may include a transmission time to the base station, time for decoding the CQI at the base station, and time for adjusting rate based on the CQI at the base station. In an aspect, the UE may determine the feedback time delay based on a time of transmission of the CQI and a time at which MCS of data received from the base station changes substantially. In an aspect the UE may use a fixed constant for the feedback delay.

In certain aspects, the CQI to be reported from the UE may be determined as a function of a CQI for each antenna set used during the CQI subframe set and a number of subframes within the CQI subframe set for which the antenna set is used. In an aspect, the CQI may include a CQI value associated with a first set of one or more antennas if a ratio between a number of subframes in the CQI subframe set using the first set of one or more antennas and a number of subframes using a second set of one or more antennas is greater than a configurable threshold. In an aspect, the CQI may include a CQI associated with a second set of one or more antennas if a ratio between a number of subframes in the CQI subframe set using a first set of one or more antennas and a number of subframes using the second set of one or more antennas is less than a configurable threshold. In an aspect, the CQI may be determined as a function of a Quality of Service (QOS) of traffic between the UE and the base station.

In certain aspects, the CQI to be reported from the UE may be a minimum of CQI for each antenna set used during the CQI subframe set. In certain aspects, the CQI to be reported from the UE may be a maximum of CQI for each antenna set used during the CQI subframe set. In certain aspects, the CQI to be reported from the UE may be an average of CQI for each antenna set used during the CQI subframe set.

In certain aspects the CQI may include a stored CQI value form a previous CQI determination. In alternative aspects, the CQI may include a stored CQI value from a previous CQI determination plus an offset.

In certain aspects, the UE may use at least one of stored channel estimates for a subset of antennas or stored CQI when a number of active receive antennas at the UE while determining the CQI is different from what is required to determine the CQI. In certain aspects, the UE may use uses at least one of current channel estimates or current CQI when active receive antennas at the UE while determining the CQI comprise an antenna subset for which the CQI is to be determined In certain aspects, the UE may adjust the CQI to compensate for a backoff applied at the base station. In an aspect, the UE may adjust the CQI to a higher CQI value if a number of antennas in the at least one set is lower than those in the at least one different set of one or more antennas. In an aspect, the UE may adjust the CQI to a lower CQI value if a number of antennas in the at least one set is higher than those in the at least one different set of one or more antennas.

In certain aspects, the UE may schedule the switch of the antennas to align with at least one of CQI reporting periods or CQI subframe set, for optimizing overall performance. In an aspect the UE may schedule the switch of the antennas such that the UE uses only one set of one or more antennas during the CQI subframe set.

In certain aspects the switch of the at least one set of one or more antennas used by the UE for communication in a first Radio Access Technology (RAT) may include using one or more additional antennas for the first RAT originally configured for communication in a second RAT. In an aspect, the first RAT may include LTE and the second RAT may include WLAN. In an aspect, the UE may select the at least one different set of one or more antennas at the UE in conjunction with a duty cycle to optimize a particular criterion. In an aspect, the criterion may include maximizing a minimum of throughputs for the first and the second RATs. In an aspect, the criterion may include maximizing a sum of throughputs for the first and the second RATs.

In certain aspects, an antenna set allocated to a particular RAT may be based in part on the type of traffic of the RAT. In certain aspects, measurements on the second RAT for an antenna being used for Long Term Evolution (LTE) may be performed on Physical downlink Shared Channel (PDSCH) part of subframes on which no Physical Downlink Control Channel (PDCCH) is decoded.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for defining, means for scheduling, means for adjusting, means for sampling, and/or means for cancelling out may comprise a processing system, which may include at least one processor, such as the transmit processor 320, the receive processor 338, or the controller/processor 340 of the eNB 110 or the receive processor 358, the transmit processor 364, or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication by a User Equipment (UE), comprising:
    scheduling a switch from at least a first set of zero or more antennas used by the UE, to at least one second set of zero or more antennas, wherein the first and second sets differ by at least one antenna, wherein the switch is scheduled during a time period of a Channel Quality Indicator (CQI) subframe set;
    determining a CQI to be reported from the UE for use at a base station in the CQI subframe set, based on the scheduled switch, wherein the CQI subframe set includes a set of subframes for which the determined CQI is to be used, wherein the CQI to be reported from the UE is determined at least as a function of a CQI for each antenna set to be used during the CQI subframe set; and
    transmitting the CQI to the base station.

2. The method of claim 1, wherein the first set of zero or more antennas are used by the UE for communication in a first Radio Access Technology (RAT), and wherein the second set comprises at least one additional antenna for the first RAT originally configured for communication in a second RAT.

3. The method of claim 1, wherein the second set comprises one or more fewer antennas than the first set.

4. The method of claim 1, further comprising:
    defining the CQI subframe set corresponding to the reported CQI, a length of the CQI subframe set corresponding to a CQI receive interval at the base station.

5. The method of claim 4, wherein the CQI receive interval at the base station is a time period between receiving two consecutive CQI reports from the UE.

6. The method of claim 1, wherein the CQI subframe set is defined based on a feedback time delay between the transmission of the CQI from the UE and a base station adjusting a transmission rate based on the CQI.

7. The method of claim 6, wherein the feedback time delay comprises transmission time to the base station, time for decoding the CQI at the base station, and time for adjusting rate based on the CQI at the base station.

8. The method of claim 6, wherein the UE determines the feedback time delay based on a time of transmission of the CQI and a time at which Modulation and Coding Scheme (MCS) of data received from the base station changes substantially.

9. The method of claim 6, wherein the UE uses a fixed constant for the feedback delay.

10. The method of claim 1, wherein the CQI to be reported from the UE is determined as a function of a combination of the CQI for each antenna set used during the CQI subframe set and a number of subframes within the CQI subframe set for which the antenna set is used.

11. The method of claim 10, wherein the CQI comprises a CQI value associated with a first set of one or more antennas if a ratio between a number of subframes in the CQI subframe set using the first set of one or more antennas and a number of subframes using a second set of one or more antennas is greater than a configurable threshold.

12. The method of claim 10, wherein the CQI comprises a CQI associated with a second set of one or more antennas if a ratio between a number of subframes in the CQI subframe set using a first set of one or more antennas and a number of subframes using the second set of one or more antennas is less than a configurable threshold.

13. The method of claim 1, wherein the CQI to be reported from the UE is a minimum of CQI for each antenna set used during the CQI subframe set.

14. The method of claim 1, wherein the CQI to be reported from the UE is a maximum of CQI for each antenna set used during the CQI subframe set.

15. The method of claim 1, wherein the CQI to be reported from the UE is an average of CQI for each antenna set used during the CQI subframe set.

16. The method of claim 1, wherein the CQI is determined as a function of a Quality of Service (QOS) of traffic between the UE and the base station.

17. The method of claim 1, wherein the CQI comprises a stored CQI value from a previous CQI determination.

18. The method of claim 1, wherein the CQI comprises a stored CQI value from a previous CQI determination plus an offset.

19. The method of claim 1, wherein the UE uses at least one of stored channel estimates for a subset of antennas or stored CQI when a number of active receive antennas at the UE while determining the CQI is different from what is required to determine the CQI.

20. The method of claim 1, wherein the UE uses at least one of current channel estimates or current CQI when active receive antennas at the UE while determining the CQI comprise an antenna subset for which the CQI is to be determined.

21. The method of claim 1, further comprising:
    adjusting the CQI to compensate for a backoff applied at the base station.

22. The method of claim 21, wherein adjusting the CQI comprises:
    adjusting the CQI to a higher CQI value if a number of antennas in the first set is lower than those in the at least one second set of zero or more antennas.

23. The method of claim 21, wherein adjusting the CQI comprises:
    adjusting the CQI to a lower CQI value if a number of antennas in the first set is higher than those in the at least one second set of zero or more antennas.

24. The method of claim 1, further comprising:
    scheduling the switch of the antennas to align with at least one of CQI reporting periods or CQI subframe set, for optimizing overall performance.

25. The method of claim 1, further comprising:
    scheduling the switch of the antennas such that the UE uses only one set of one or more antennas during the CQI subframe set.

26. The method of claim 2, wherein the first RAT comprises Long Term Evolution (LTE).

27. The method of claim 26, wherein the second RAT comprises Wireless Local Area Network (WLAN).

28. The method of claim 1, further comprising:
    selecting the at least one second set of zero or more antennas at the UE in conjunction with a duty cycle to optimize a particular criterion.

29. The method of claim 28, wherein the criterion comprises maximizing a minimum of throughputs for at least a first and a second Radio Access Technology (RAT).

30. The method of claim 28, wherein the criterion comprises maximizing a sum of throughputs for at least a first and a second Radio Access Technology (RAT).

31. The method of claim 1, wherein an antenna set allocated to a particular RAT is based in part on a type of traffic of the RAT.

32. The method of claim 2 wherein measurements on the second RAT for an antenna being used for Long Term Evolution (LTE) are performed on Physical downlink Shared Channel (PDSCH) part of subframes on which no Physical Downlink Control Channel (PDCCH) is decoded.

33. An apparatus for wireless communication by a User Equipment (UE), comprising:
    means for scheduling a switch from at least a first set of zero or more antennas used by the UE, to at least one second set of zero or more antennas, wherein the first and second sets differ by at least one antenna, wherein the switch is scheduled during a time period of a Channel Quality Indicator (CQI) subframe set;
    means for determining a CQI to be reported from the UE for use at a base station in the CQI subframe set, based on the scheduled switch, wherein the CQI subframe set includes a set of subframes for which the determined CQI is to be used, wherein the CQI to be reported from the UE is determined at least as a function of a CQI for each antenna set to be used during the CQI subframe set; and
    means for transmitting the CQI to the base station.

34. The apparatus of claim 33, wherein the first set of zero or more antennas are used by the UE for communication in a first Radio Access Technology (RAT), and wherein the second set comprises at least one additional antenna for the first RAT originally configured for communication in a second RAT.

35. The apparatus of claim 33, wherein the second set comprises one or more fewer antennas than the first set.

36. The apparatus of claim 33, further comprising:
    means for defining the CQI subframe set corresponding to the reported CQI, a length of the CQI subframe set corresponding to a CQI receive interval at the base station.

37. The apparatus of claim 36, wherein the CQI receive interval at the base station is a time period between receiving two consecutive CQI reports from the UE.

38. The apparatus of claim 33, wherein the CQI subframe set is defined based on a feedback time delay between the transmission of the CQI from the UE and a base station adjusting a transmission rate based on the CQI.

39. The apparatus of claim 38, wherein the feedback time delay comprises transmission time to the base station, time for decoding the CQI at the base station, and time for adjusting rate based on the CQI at the base station.

40. The apparatus of claim 38, wherein the UE determines the feedback time delay based on a time of transmission of the CQI and a time at which Modulation and Coding Scheme (MCS) of data received from the base station changes substantially.

41. The method of claim 38, wherein the UE uses a fixed constant for the feedback delay.

42. The apparatus of claim 33, wherein the CQI to be reported from the UE is determined as a function of a combination of the CQI for each antenna set used during the CQI subframe set and a number of subframes within the CQI subframe set for which the antenna set is used.

43. The apparatus of claim 42, wherein the CQI comprises a CQI value associated with a first set of one or more antennas if a ratio between a number of subframes in the CQI subframe set using the first set of one or more antennas and a number of subframes using a second set of one or more antennas is greater than a configurable threshold.

44. The apparatus of claim 42, wherein the CQI comprises a CQI associated with a second set of one or more antennas if a ratio between a number of subframes in the CQI subframe set using a first set of one or more antennas and a number of subframes using the second set of one or more antennas is less than a configurable threshold.

45. The apparatus of claim 33, wherein the CQI to be reported from the UE is a minimum of CQI for each antenna set used during the CQI subframe set.

46. The apparatus of claim 33, wherein the CQI to be reported from the UE is a maximum of CQI for each antenna set used during the CQI subframe set.

47. The apparatus of claim 33, wherein the CQI to be reported from the UE is an average of CQI for each antenna set used during the CQI subframe set.

48. The apparatus of claim 33, wherein the CQI is determined as a function of a Quality of Service (QOS) of traffic between the UE and the base station.

49. The apparatus of claim 33, wherein the CQI comprises a stored CQI value from a previous CQI determination.

50. The apparatus of claim 33, wherein the CQI comprises a stored CQI value from a previous CQI determination plus an offset.

51. The apparatus of claim 33, wherein the UE uses at least one of stored channel estimates for a subset of antennas or stored CQI when a number of active receive antennas at the UE while determining the CQI is different from what is required to determine the CQI.

52. The apparatus of claim 33, wherein the UE uses at least one of current channel estimates or current CQI when active receive antennas at the UE while determining the CQI comprise an antenna subset for which the CQI is to be determined.

53. The apparatus of claim 33, further comprising:
    means for adjusting the CQI to compensate for a backoff applied at the base station.

54. The apparatus of claim 53, wherein the means for adjusting the CQI is configured to:
    adjust the CQI to a higher CQI value if a number of antennas in the first set is lower than those in the at least one second set of zero or more antennas.

55. The apparatus of claim 53, wherein the means for adjusting the CQI is configured to:
    adjust the CQI to a lower CQI value if a number of antennas in the first set is higher than those in the at least one second set of zero or more antennas.

56. The apparatus of claim 33, further comprising:
    means for scheduling the switch of the antennas to align with at least one of CQI reporting periods or CQI subframe set, for optimizing overall performance.

57. The apparatus of claim 33, further comprising:
    scheduling the switch of the antennas such that the UE uses only one set of one or more antennas during the CQI subframe set.

58. The apparatus of claim 34, wherein the first RAT comprises Long Term Evolution (LTE).

59. The apparatus of claim 58, wherein the second RAT comprises Wireless Local Area Network (WLAN).

60. The apparatus of claim 33, further comprising:
means for selecting the at least one second set of zero or more antennas at the UE in conjunction with a duty cycle to optimize a particular criterion.

61. The apparatus of claim 60, wherein the criterion comprises maximizing a minimum of throughputs for at least a first and a second Radio Access Technology (RAT).

62. The apparatus of claim 60, wherein the criterion comprises maximizing a sum of throughputs for at least a first and a second Radio Access Technology (RAT).

63. The apparatus of claim 33, wherein an antenna set allocated to a particular RAT is based in part on a type of traffic of the RAT.

64. The apparatus of claim 34 wherein measurements on the second RAT for an antenna being used for Long Term Evolution (LTE) are performed on Physical downlink Shared Channel (PDSCH) part of subframes on which no Physical Downlink Control Channel (PDCCH) is decoded.

65. An apparatus for wireless communication by a User Equipment (UE), comprising:
at least one processor configured to:
schedule a switch from at least a first set of zero or more antennas used by the UE, to at least one second set of zero or more antennas, wherein the first and second sets differ by at least one antenna, wherein the switch is scheduled during a time period of a Channel Quality Indicator (CQI) subframe set;
determine a CQI to be reported from the UE for use at a base station in the CQI subframe set, based on the scheduled switch, wherein the CQI subframe set includes a set of subframes for which the determined CQI is to be used, wherein the CQI to be reported from the UE is determined at least as a function of a CQI for each antenna set to be used during the CQI subframe set; and
transmit the CQI to the base station; and
a memory coupled to the at least one processor.

66. A non-transitory computer-readable medium for wireless communication by a User Equipment (UE), comprising code for:
scheduling a switch from at least a first set of zero or more antennas used by the UE, to at least one second set of zero or more antennas, wherein the first and second sets differ by at least one antenna, wherein the switch is scheduled during a time period of a Channel Quality Indicator (CQI) subframe set;
determining a CQI to be reported from the UE for use at a base station in the CQI subframe set, based on the scheduled switch, wherein the CQI subframe set includes a set of subframes for which the determined CQI is to be used, wherein the CQI to be reported from the UE is determined at least as a function of a CQI for each antenna set to be used during the CQI subframe set; and
transmitting the CQI to the base station.

* * * * *